(12) United States Patent
Horn

(10) Patent No.: US 9,540,172 B2
(45) Date of Patent: Jan. 10, 2017

(54) HIGH VOLUME CONVEYOR TRANSPORT FOR CLEAN ENVIRONMENTS

(71) Applicant: MIDDLESEX GENERAL INDUSTRIES, INC., Woburn, MA (US)

(72) Inventor: George W. Horn, Brissago (CH)

(73) Assignee: MIDDLESEX GENERAL INDUSTRIES, INC., Woburn, MA (US)

( * ) Notice: Subject to any disclaimer, the term of this patent is extended or adjusted under 35 U.S.C. 154(b) by 0 days.

(21) Appl. No.: 14/691,881

(22) Filed: Apr. 21, 2015

(65) Prior Publication Data

US 2015/0225174 A1   Aug. 13, 2015

Related U.S. Application Data

(63) Continuation-in-part of application No. 14/520,977, filed on Oct. 22, 2014, now abandoned.

(60) Provisional application No. 61/894,079, filed on Oct. 22, 2013.

(51) Int. Cl.
*B65G 15/12* (2006.01)
*B65G 23/10* (2006.01)
*B65G 39/06* (2006.01)

(52) U.S. Cl.
CPC ............... *B65G 15/12* (2013.01); *B65G 23/10* (2013.01); *B65G 39/06* (2013.01)

(58) Field of Classification Search
CPC ....... B65G 15/105; B65G 15/12; B65G 15/60; B65G 23/10; B65G 39/02; B65G 39/06; B65G 39/07; B65G 39/071; B65G 39/12; B65G 47/31

See application file for complete search history.

(56) References Cited

U.S. PATENT DOCUMENTS

| | | |
|---|---|---|
| 3,443,674 A | 5/1969 | Kornylak |
| 3,967,721 A | 7/1976 | Rhoden |
| 4,006,810 A | 2/1977 | Kornylak |
| 4,203,509 A | 5/1980 | Thompson et al. |
| 4,379,503 A | 4/1983 | Kornylak |
| 4,793,262 A | 12/1988 | Horn |
| 4,969,548 A | 11/1990 | Kornylak |
| 5,240,104 A * | 8/1993 | Douglas ............ H05K 13/0061 198/570 |
| 5,452,801 A | 9/1995 | Horn |
| 6,047,812 A | 4/2000 | Horn |
| 6,811,018 B2 | 11/2004 | Cotter et al. |
| 6,820,736 B2 | 11/2004 | Itoh |
| 6,854,583 B1 | 2/2005 | Horn |
| 6,971,500 B2 | 12/2005 | Horn |
| 7,131,508 B2 | 11/2006 | Brazier |
| 7,503,451 B2 | 3/2009 | Hirasawa |

(Continued)

*Primary Examiner* — Gene Crawford
*Assistant Examiner* — Keith R Campbell
(74) *Attorney, Agent, or Firm* — Preti Flaherty Beliveau & Pachios LLP

(57) ABSTRACT

A segmented, belt-driven conveyor system for use in clean environments is described. High speed, high density, collision free throughput of work piece carriers is enabled through belt-driven conveyor segments each having co-rotating drive wheels. The drive wheels have a cylindrical profile. Predefined acceleration/deceleration profiles may be employed by a motor controller to affect optimal changes in work piece carrier speed across the respective drive segment.

22 Claims, 10 Drawing Sheets

(56) References Cited

U.S. PATENT DOCUMENTS

| | | | |
|---|---|---|---|
| 7,784,606 B2 * | 8/2010 | Bonora | B65G 15/12 198/343.2 |
| 8,033,383 B2 * | 10/2011 | Horn | B65G 13/06 198/606 |
| 8,096,408 B2 * | 1/2012 | Deyanov | B65G 21/00 198/345.3 |
| 8,205,558 B2 | 6/2012 | Horn | |
| 8,668,078 B2 | 3/2014 | Horn | |
| 8,851,264 B2 | 10/2014 | Guo et al. | |
| 2004/0144616 A1 | 7/2004 | Leon | |
| 2004/0168886 A1 | 9/2004 | Quadracci et al. | |
| 2006/0016668 A1 * | 1/2006 | Helgerson | B65G 13/06 198/805 |
| 2006/0151297 A1 | 7/2006 | Pyke | |
| 2006/0283689 A1 | 12/2006 | Schiesser et al. | |
| 2009/0049682 A1 | 2/2009 | Yagi et al. | |
| 2010/0051422 A1 | 3/2010 | Bonora et al. | |
| 2011/0303510 A1 * | 12/2011 | Horn | B65G 47/261 198/606 |
| 2015/0075944 A1 | 3/2015 | Guo et al. | |

\* cited by examiner

HIGH VOLUME CONVEYOR TRANSPORT FOR CLEAN ENVIRONMENTS

This patent application is a continuation-in-part of U.S. patent application Ser. No. 14/520,977, filed Oct. 22, 2014, which claims benefit of the priority of U.S. Provisional Patent Application No. 61/894,079, filed Oct. 22, 2013, the disclosures of which are incorporated by reference herein in their entirety.

STATEMENT REGARDING FEDERALLY SPONSORED RESEARCH OR DEVELOPMENT

N/A

BACKGROUND OF THE INVENTION

Many manufacturing factory environments consist of spatially distributed processing tools, as opposed to sequential tools located along a linearly arranged assembly line. This is especially true for manufacturing environments where work in process, or a "work entity," re-enters a tool after being processed by another tool or tools. Re-entry into the same tool avoids tool duplication, which is particularly important in environments where the capital cost of the tools is high.

A semiconductor manufacturing environment is an example of an environment where, due to high tool cost, a work entity enters a given tool, or type of tool, multiple times. Processing tools in a semiconductor manufacturing environment are typically spatially distributed in the factory according to function. Thus, the work flow resembles a chaotic movement of the work entity. With multiple work entities being operated upon and moving between multiple tools at the same time, the respective work flows intersect.

In modern factories, the progress of multiple work entities through the high number of manufacturing steps and associated tools is enabled by transport networks. Simultaneous processing of plural work entities, necessary to maximize usage of the factory tools and to maximize product output, results in highly complicated logistics. High efficiency and coordination in work entity movement is thus required. Without an efficient transportation network capable of rapid, real time response, bottlenecks in the work flow into or out of some process tools can develop (flow density), while other process tools are starved of work. Such an efficient transportation network thus must have high delivery capacity, high speed, and asynchronous capability by which work carriers can move independently of each other. The transport infrastructure is the enabling technology for such efficient logistics.

In a recursive process flow environment, such as within a semiconductor manufacturing environment, the simultaneous utilization of up to hundreds of individual process tools requires a logistics network that is capable of delivering the right work entity at the right time to each one of the tools. The higher the utilization of each processing tool, the higher the factory output, which simultaneously translates to the increased efficiency of business capital.

Conveyor systems are one particular type of transportation system used in contemporary factory environments. A conveyor network may be shared by several hundred moving work carriers concurrently dispatched to various tools. Delivery capacity will depend on flow density and conveyor speed. However, flow density and speed are limited by the additional requirements of zero tolerance for collisions between work entities within the conveyor system, and of a particulation free environment. Thus, a conflict arises between the above requirements.

A conveyor network typically has intersections, nodes, and branches to multiple locations in a factory. The open conveyor ends, at work processing locations, are the input and output ports for the conveyor transport domain. At these ports, work entities enter and leave the conveyor domain. When a work entity needs to travel from one of these ports to another in the prior art, a path needed to be cleared for the transit to satisfy the requirement of collision avoidance. Normally, external or centralized dispatch software arranges for such a transit by simultaneously controlling the movement of all other work entities that would otherwise interfere with the work entity in question. This dispatch software is complex, due to the aforementioned throughput requirements. The work entities need be moved concurrently with each other and at maximum rate without collisions.

In addition to the challenge of highly complex control in dense manufacturing environments, particulate generation by conveyor systems is of great concern in clean room environments. Thus, the efficiency of transport systems in such environments must be weighed against the opportunities for contamination.

Traditional roller conveyors have achieved extremely low particulate generation. However, such arrangements have not been able to achieve high acceleration of items or carriers transported thereon (generically referred to simply as "carriers" herein) from a stopped condition. This is not due to a lack of torque available for the drive rollers but instead due to the fact that when high starting torque is applied the roller wheels may slip and squeal. This is akin to auto tires squealing when accelerating too rapidly from a stop.

In certain embodiments, a hysteresis clutch has been utilized in conjunction with synchronous or stepper motor driven rollers or wheels, depending upon the embodiment, to eliminate such slippage between the carriers and drives. Hysteresis clutches enable asynchronous soft buffering, a process for moving carriers independent of each other and starting and stopping the carriers in a smooth fashion. However, while successful at preventing slippage, hysteresis clutches may make it difficult to achieve high rates of acceleration, including in the multiple g range. Very fast acceleration and deceleration are required in order to increase throughput and thus the density of carriers traveling on the soft buffered conveyor where carriers must never collide. Since the carriers move asynchronously, they need to stop fast and short of a collision with a downstream carrier to achieve increased density in a conveyor environment, as well as start fast so as to minimize interference with upstream carriers. Preferably, start and stop should occur within a line segment that is a little larger than the carrier.

Principles of physics dictate that the frictional force required to move an object on a surface is dependent on the normal force and the coefficient of friction for the materials. In other words, it is independent of the area in contact. However, with compressive materials, higher friction forces can be achieved by selectively increasing the surface contact. A result of this realization was the increased utilization of belts for carrier transport, instead of wheels with a rubber drive surface in contact with carriers. This increase in surface area contact in effect increased the friction force between driving and driven surfaces.

Unfortunately, simply disposing a driving belt on a respective set of wheels is not clean in terms of particulate generation, particularly with respect to that resulting from the use of driven and idler wheels alone. The particulation of the belts results primarily from interaction of the belt with the wheels below the belt, i.e. those supporting the weight of a carrier. Previous investigations into the source of particulate generation determined that in many cases the belt was not in continuous, full contact with the wheels below it due to machining tolerances in the wheels, the respective axles, and/or the rails that support the wheels. For example, some supporting idler wheels were found to be in constant contact with the overlying belt and thus were turning in concert with the belt while others started and stopped depending on when the belt touched them. The latter contact was haphazard, resulting in frictionally-induced spin up and stops of the supporting idler wheels. This effect was sometimes dependent upon whether a carrier was above the respective portion of belted conveyor.

In order to impart continuous contact between the belt and all of the wheels in a respective conveyor section, including the idler wheels, it was proposed that the belt be woven in a serpentine path between wheels, such as over two idler wheels and then down under the next. While successful in maintaining contact between the belt and all of the respective wheels, this resulted in an increased motor torque requirement, which also required increased electrical current and thus operational cost.

There remains the need for an optimized transport solution that results in high density, rapid, flexible, and asynchronous work entity transport, high delivery capacity, avoidance of work entity collisions, and low particulation, for use in clean room environments.

BRIEF SUMMARY OF THE INVENTION

To resolve the inherent conflict between the need for high speed work piece conveyance and the avoidance of work piece collisions and to increase throughput, an infrastructure conveyor line in accordance with an embodiment is divided into segments, each having a length similar to that of a work entity or work piece carrier. A work piece carrier is prevented from entering a conveyor segment if that segment is already occupied by another work piece carrier. Such collision avoidance is autonomous, embedded in the conveyor elements, allowing a natural, independent flow of dispatched work piece carriers, an approach that is distinct from the centralized control model as practiced in the prior art. By dividing the longer conveyor runs of the prior art into discrete segments and by enabling intelligent, local control of work piece carriers transiting between segments, the capacity-limiting procedure of reserving whole conveyor line runs for dispatched work carriers is avoided.

Work piece carriers can be sent from port to port autonomously with high flow densities. With the use of localized, segment-based sensing and conveyor control, carriers can occupy adjacent segments, if needed, and can pass through nodes on a first come, first served or "natural" basis.

How close work piece carriers can be, on consecutive conveyor segments, a concept referred to as "stacking," depends in part upon work piece carrier travel velocities, i.e. conveyor speed. In the prior art, the prohibition against entry of a work piece carrier into a zone already occupied by another work piece carrier demanded generous spacing of the traveling carriers to ensure sufficient stopping distances to avoid collisions. The higher the speed, the greater the stopping distance, resulting in less flow density. The limitations on stopping (or starting) distance in the prior art is a consequence of using rollers to drive the work piece carriers on a particulation free conveyor. Yet such rollers were previously thought to be the only means of achieving clean, particulate free movement. In the pursuit of clean transport, roller conveyors utilized moderate transport speeds to avoid the slipping of the work piece carriers on the rollers when sudden stopping was necessary to avoid collisions with a downstream, stationary work piece carrier. Thus, the physics of the limited contact surface between work piece carriers and the driving conveyor rollers required such moderate speeds.

With elastic surface contacts, frictional force increases with increasing surface contact. Thus, to increase driving surface contact between the conveyor drive and the work piece carrier, some of the wheels or rollers of a conveyor in various embodiments are supplemented with belts of high friction coefficients. However, while improving the frictional engagement between work piece carriers and the segmented conveyor, the introduction of belts may introduce new particulate sources, particularly with respect to idler wheels, as discussed above. Overcoming these difficulties, through developments described herein, allows the introduction of high speed, belted, locally controlled segmented conveyors providing high rates of work piece carrier acceleration and deceleration in clean manufacturing environments. High flow density, at high speeds, thus result.

When velocities are high and stopping and starting distances must be short, the rate of acceleration and deceleration of the work piece carrier must be limited to avoid slippage on the belt, a condition that could create contaminating particulates. Previous control of particulation through limited rates of acceleration and deceleration were achieved through the use of a magnetic hysteresis clutch in conjunction with conveyor segment drive wheels or rollers. The clutch acts as a limiting device on drive roller torque, and can be set to disengage when sudden starting acceleration or rapid stopping of a high speed motor would otherwise cause the frictional force between the conveyor and the work piece carrier to be exceeded. The application of such a clutch allowed masses and velocities of the work piece carrier to be variable (e.g., the weight difference between a full work piece carrier versus an empty work piece carrier) while not exceeding a maximum value of inertia.

However, it has been discovered that the use of elastic surface contact between a conveyor-driven belt and a work piece carrier provides improved frictional engagement, thus obviating the need for clutch-based techniques for limiting frictional forces. Higher rates of acceleration and deceleration, programmed into local segment controllers, can be employed, thus improving throughput while avoiding collisions. Such motor control can be achieved through servo action or by predefining and limiting open loop stepper motor rates of acceleration or deceleration. Thus, in a particulate-free clean manufacturing environment, segmented conveyors with belts, driven by open loop stepper motors or servo motors with controlled high rates of acceleration and deceleration, results in a collision-free flow of work carriers at high density and high speed, resulting in increased conveyor throughput.

In one particular non-limiting embodiment, to achieve improved contact between a drive belt and wheels within a respective conveyor section, and idler wheels in particular, a peripheral groove is formed in each wheel disposed beneath the belt. A soft, pliant ring of material is then disposed in the groove. The ring protrudes slightly beyond the crown of the idler wheel.

The slight protrusion of the pliant ring results in improved reliability of contact with the drive belt as it passes above the uneven idler wheels. The idler wheels turn in coordination with the drive belt at all times. Particulation is thus significantly reduced and drive motor torque requirements are also reduced in comparison to the serpentine belt embodiment previously described.

Each pliant ring is configured to achieve constant contact with the overlying belt when unloaded by a carrier. When a carrier or other item being transported is adjacent or above a respective wheel, the pliant ring is compressed and the belt comes into contact with the relatively hard wheel crown or periphery itself, increasing the area of contact between the belt and wheel. Thus, the pliant ring material and extent of protrusion above the wheel crown are selected to achieve a high degree of belt contact between the pliant ring and the belt when unloaded and direct contact between the wheel crown and the belt when loaded. Rapid acceleration and deceleration of carriers is achieved with a relatively low degree of required torque and with minimized particulation.

Another embodiment provides for the reduction of particulation between the belt and the idler wheels. Rather than using high coefficient of friction and soft materials (such as the ring which assures synchronization of their relative speeds) at their interface, this non-limiting embodiment utilized a low coefficient of friction and hard idler wheel material, such as nylon, and ignores the lack of synchronized speeds. In this embodiment the idler wheels are cylindrically shaped except those at the two ends of the belt loop, which have centering crowns. The belt can be elastically stretched over all idlers and drives (eliminating the need for additional tensioning wheels).

DETAILED DESCRIPTION OF THE INVENTION

Figure 1:
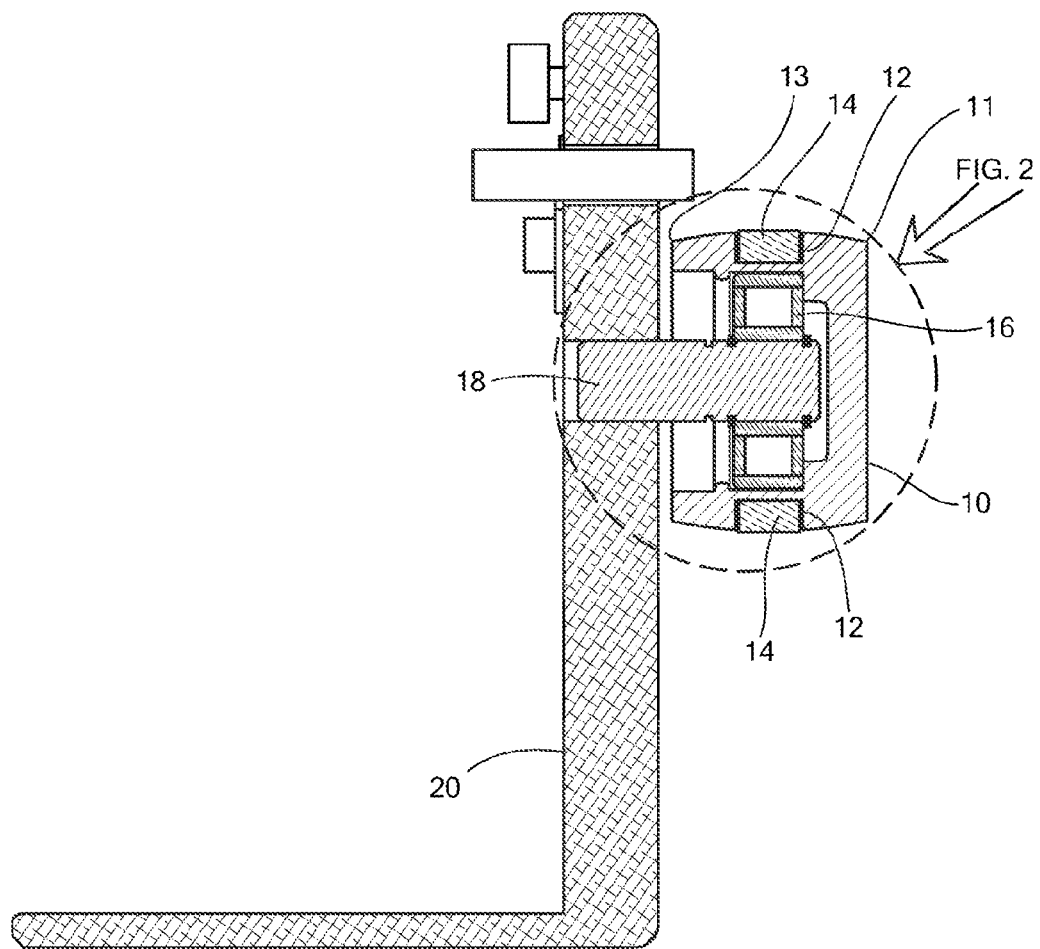
FIG. 1 is a section view of a wheel according to the present invention disposed from a supporting rail frame.

FIG. 1 illustrates an idler wheel hub 10 disposed in relation to a supporting rail frame 20. The wheel hub, also simply referred to herein as "the wheel," may be formed of a hard, resilient material that is resistant to particulation, such as polyurethane. One preferred embodiment of the wheel 10 employs 75 Shore D cast electrostatic discharge (ESD) polyurethane rods that are machined to the desired shape and size after casting. Alternatively, a 67D polyester-type Thermoplastic Polyurethane (TPU) such as ESTANE™ (of Lubrizol Advanced Materials, Inc., Cleveland, Ohio) 58137 TPU. The wheel, in the illustrated embodiment, is substantially cylindrical, though, as can be more clearly seen in FIG. 2, has an outer periphery that is inclined with respect to an axis of symmetry 24 centered within the respective axle 18. Specifically, the radius of the wheel at either a front edge 11 or rear edge 13 is less than the radius measured closer to the middle of the wheel. This difference in radius can be linear or curved, the latter being illustrated in the figures.

The wheel 10 is disposed upon a bearing assembly 16 of conventional design and configuration. The bearing assembly 16 is disposed about an axle 18 that projects from a drive rail 20. The axle is shown as being threaded in the figures, and can be mated with a complimentarily threaded bore in the drive rail. However, the axle may be mechanically mated with respect to the drive rail in any conventional manner. The drive rail is shown as being L-shaped in FIG. 1, though it can be provided in a variety of shapes.

Figure 2:
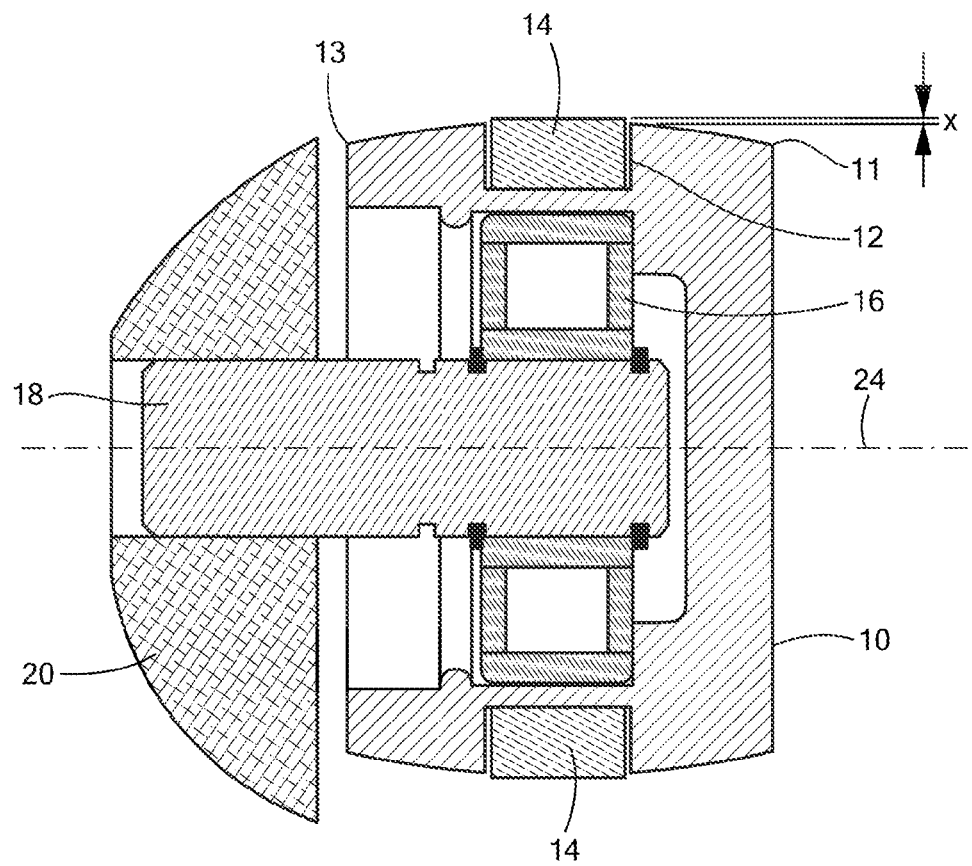
FIG. 2 is a detailed view of the wheel of FIG. 1.

Disposed about the wheel outer peripheral surface is a slot 12. As shown in FIG. 2, the slot is continuous about the periphery of the wheel to form a ring-shaped or circular slot into which is provided a ring of pliant material 14. In a first, illustrated embodiment, the slot and the ring of pliant material are rectangular in cross-section, though in other embodiments, different geometries can be utilized. For example, in another embodiment, the pliant ring may have a circular or ovoid cross-section, while the slot has a complimentary semicircular or semi-ovoid cross-section. The pliant ring is preferably configured to have a maximum thickness, measured in the radial direction of the wheel, that is slightly greater than the maximum depth of the slot. Thus, the pliant ring normally extends a distance x beyond the proximal surface of the wheel itself. The pliant ring is provided of polyurethane in a first embodiment, though other soft, compressible, non-friable materials can be used. Such other materials may include silicone and rubber. In a preferred embodiment, the pliant ring is stretched and forced over the wheel outer periphery and into the slot. The diameter of the pliant ring at rest may be less than the diameter of the slot, such that the pliant ring is held in place through friction fit in one embodiment. In other embodiments, the pliant ring is held in place through an adhesive bond or through mechanical means, including friction fit between the side walls of the pliant ring and the side walls of the slot (not shown).

Figure 3:
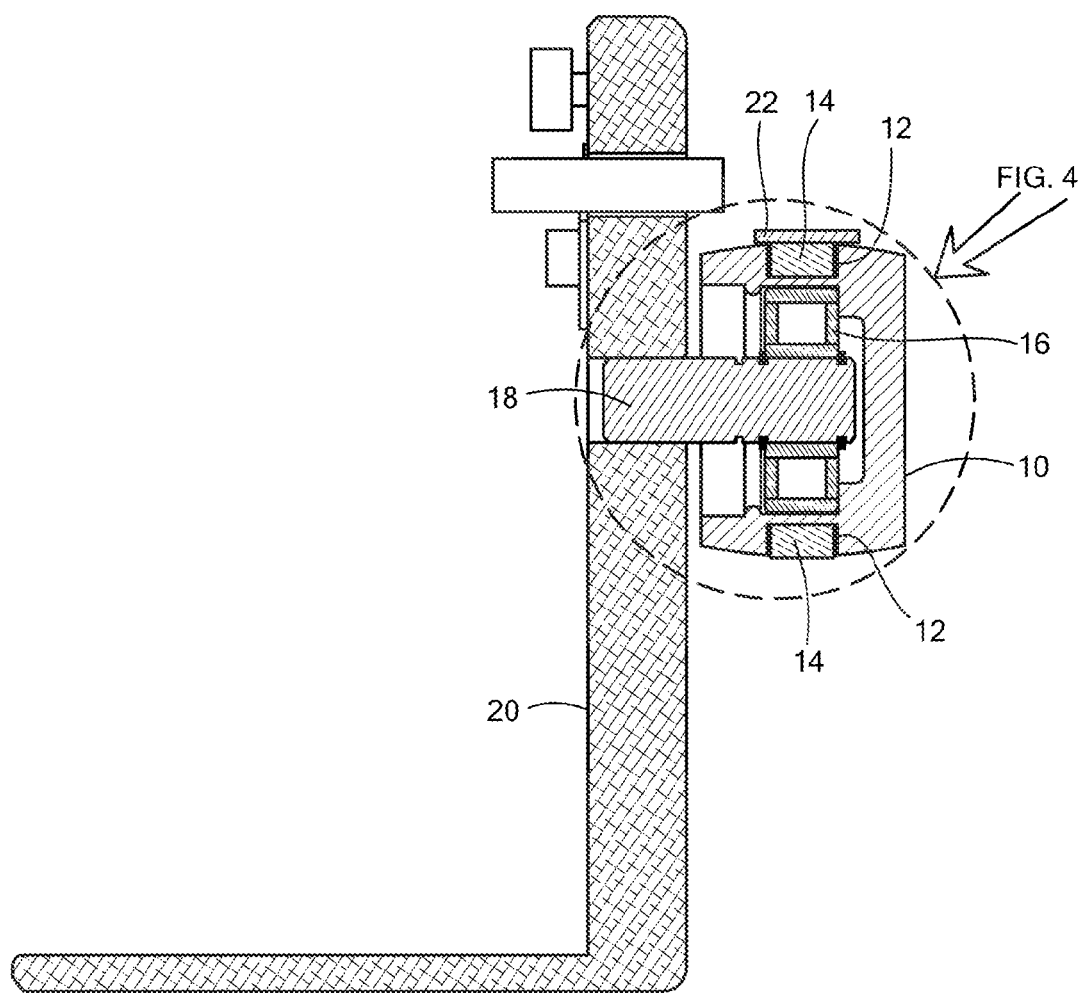
FIG. 3 is a section view of an end idler wheel further illustrating the crowned shape.
Figure 4:
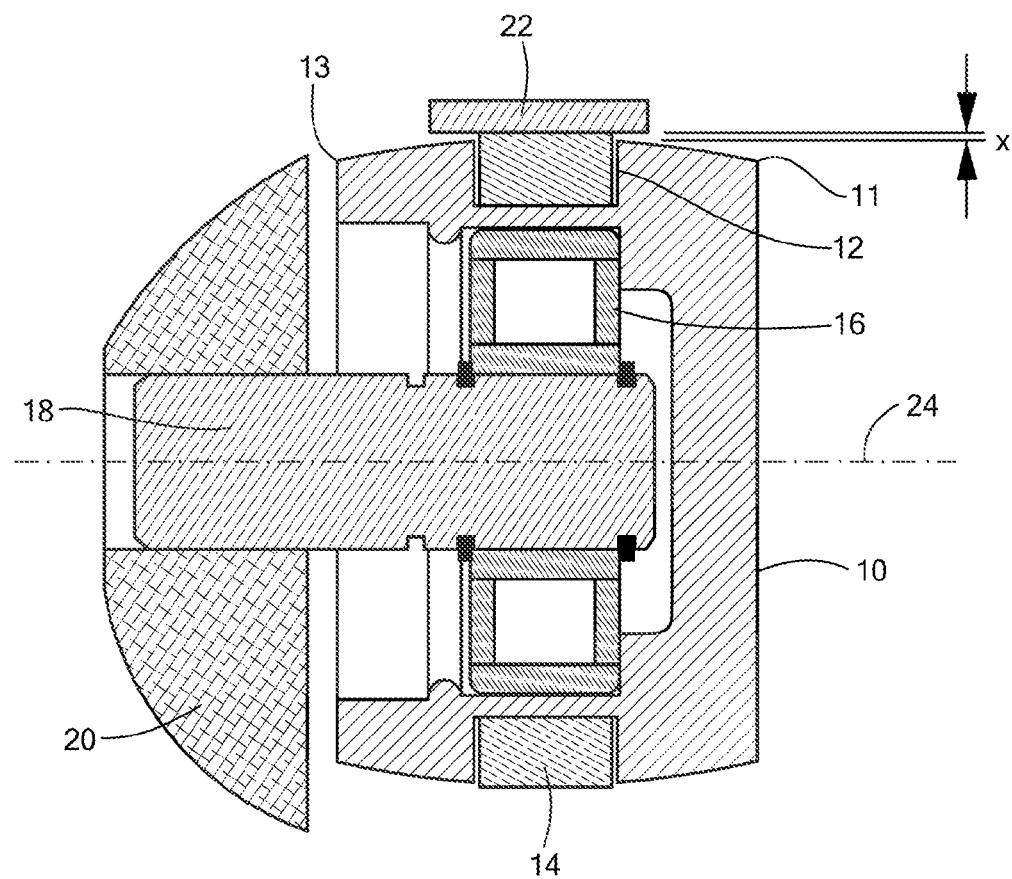
FIG. 4 is a detailed view of the wheel of FIG. 3.

In FIG. 3, a drive belt 22 is shown in cross-section, disposed across the top of the pliant ring 14. This is also depicted in greater detail in FIG. 4. When there is no carrier or other item being transported on or proximate to the respective wheel, the belt lower surface remains in contact at least with the upper or outer surface of the pliant ring 14, whereby the respective wheel may respond immediately and without slipping to movement of the belt. Should a wheel have a defect in an outer extent thereof, or if an axle 18 is bent or otherwise not orthogonal to a drive rail, the belt may also at times come into contact with the outer surface of the wheel itself. However, the pliant ring is intended to ensure that the belt is always in contact with the respective wheel, either directly or indirectly, in order to avoid particulation resulting from intermittent contact between the belt and wheel.

The choice of materials for the drive belt 22 depends in part upon desired values for durometer and electrical conductivity. Pyrathane 83ASD and Stat-Rite S-1107 are typical belt materials. A belt of Pyrathane is somewhat softer and more elastic but simultaneously less electrically conductive. A belt of Stat-Rite is harder and more stiff, but simultaneously more electrically conductive. Preferably, the elastomeric belt is stretched onto the wheels and serves to directly transport overlying work piece carriers through interaction with all of the idler and drive wheels.

Figure 6:
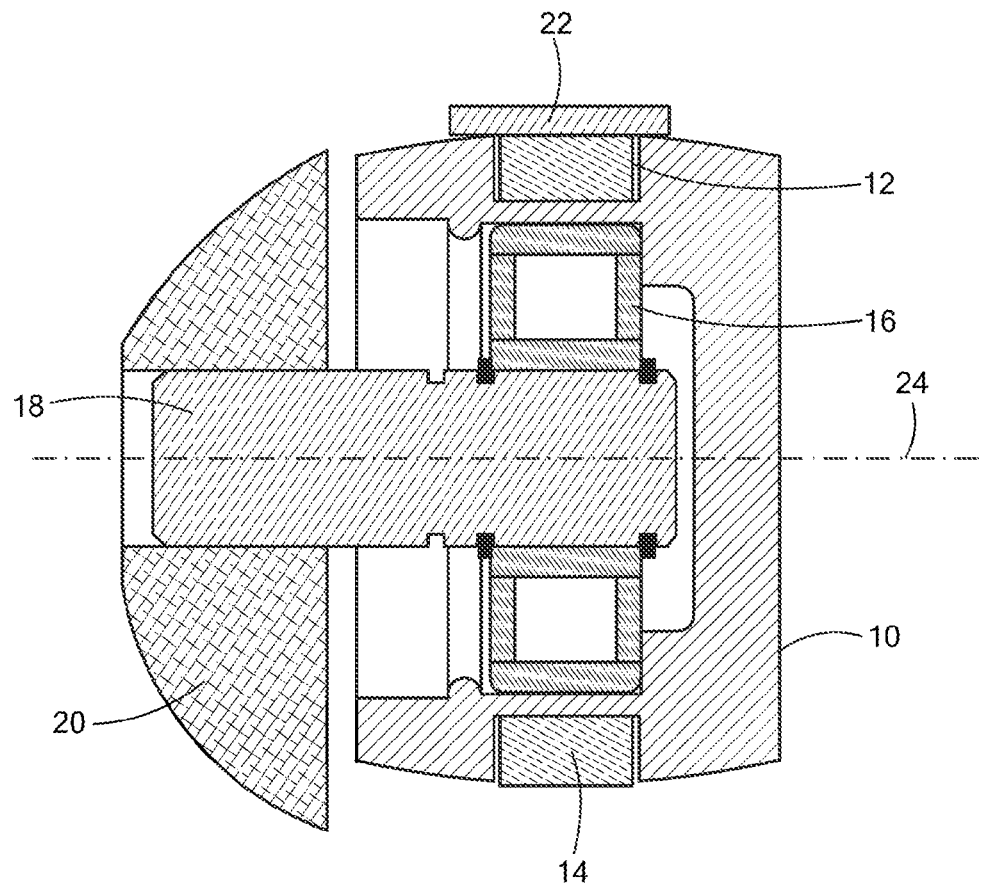
FIG. 6 is a detailed view of the wheel of FIG. 3 under loaded conditions.

Once a carrier (not shown) is on the belt 22 above or proximate a particular wheel 10, the weight of the carrier is sufficient to compress the pliant ring 14 such that the belt 22 undersurface comes into direct contact with the relatively hard surface of the wheel outer surface, as shown in FIG. 6. The hardness of the wheel ensures that the belt does not dip as the weight of the carrier traverses each wheel and instead provides a level, smooth transition for the carrier. In addition, the increased area of contact between the belt lower extent and the wheel periphery, compared to the area of contact between the belt lower extent and the pliant ring periphery, ensures sufficient frictional force to achieve accurate rotational tracking between the belt and wheel.

Figure 5:
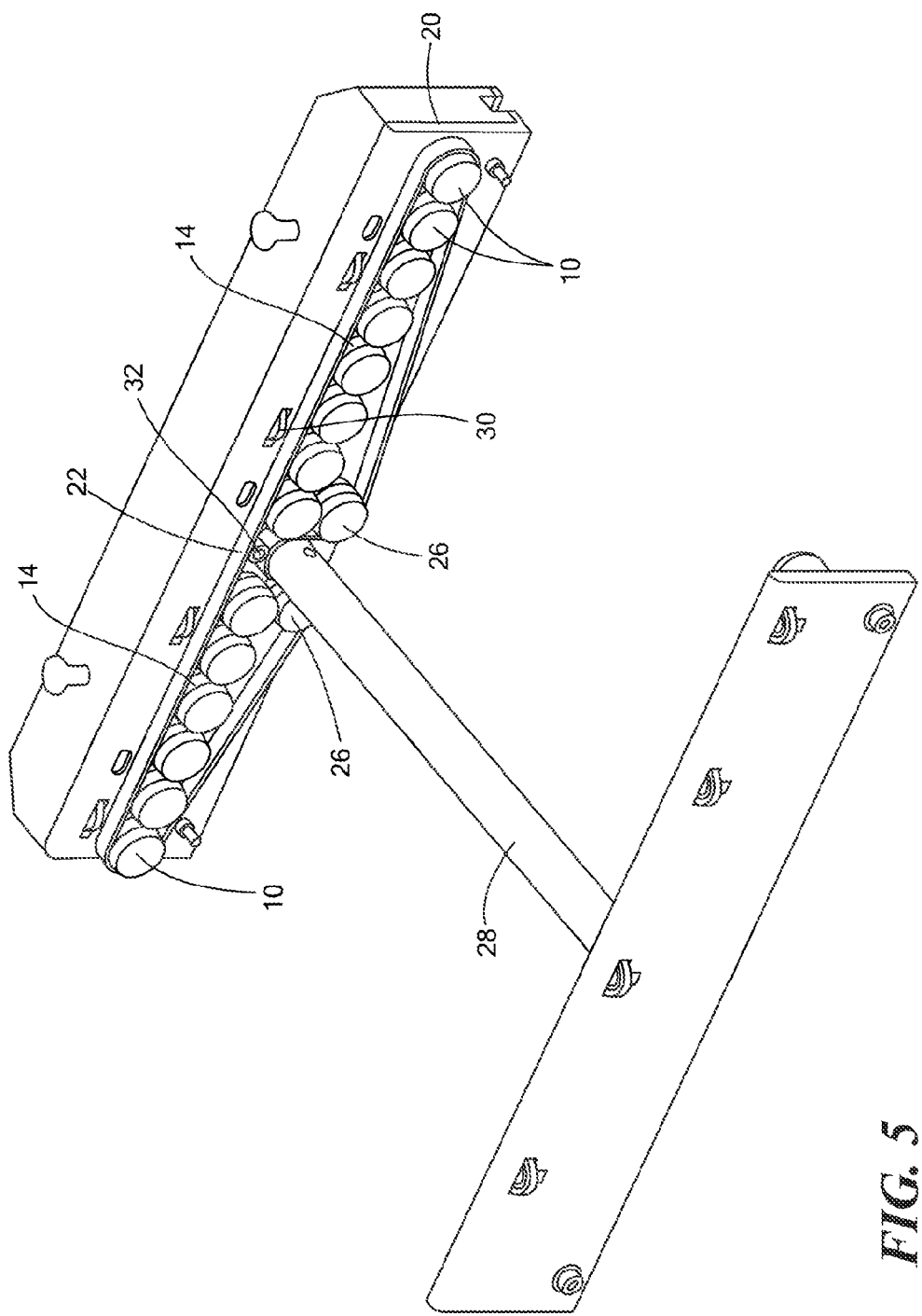
FIG. 5 is a perspective view of a conveyor drive segment in which is illustrated a drive belt, at least one drive wheel, and a plurality of idler wheels according to the present invention.

In FIG. 5, a perspective view of one embodiment of a drive segment can be seen. The length of a conveyor segment is determined by a number of drive segments it comprises. A drive segment is defined as the length of a work piece carrier plus some margin of free space. Thus, depending upon the embodiment, a conveyor segment may be configured to hold one, two, or more drive segments. With this modular approach, the designer of a conveyor application then constructs the conveyor layout using standard, prefabricated modules of length which hold an integral number of drive segments each. This methodology allows easy conveyor network design and assembly.

In the figure, a linear array of wheels 10 is provided in relation to a drive rail 20. In the illustrated embodiment, each such wheel 10 of the array is provided with a peripherally disposed pliant ring 14 to improve the degree of rotational contact between the wheels and an overlying, continuous belt 22. In this illustrated embodiment, each of the wheels 10 in the linear array across the conveyor segment are idler wheels. In other words, each of the wheels of the linear array are unpowered and are rotated through continuous contact with the overlying belt. Note that in other, more simplified embodiments, the idler wheels are crowned, as shown in FIGS. 1 and 2, but are not provided with a slot 12 or pliant ring 14. Further still, in yet other embodiments, some or all of the idler wheels have a flat outer surface, parallel to the axle 18, upon which a respective belt 22 rolls.

At opposite ends of the linear array, the belt 22 extends slightly less than 180 degrees about respective end wheels 10 in substantially the opposite direction towards two lower return idler wheels 26. The belt extends approximately 90 degrees about these return wheels and thence about the upper surface of a drive rod 28. Each of the return wheels 26 and the drive rod 28 may also be provided with a respective pliant ring 14 in an alternative embodiment, while in other embodiments, one or both do not have a respective pliant ring.

Figure 7:
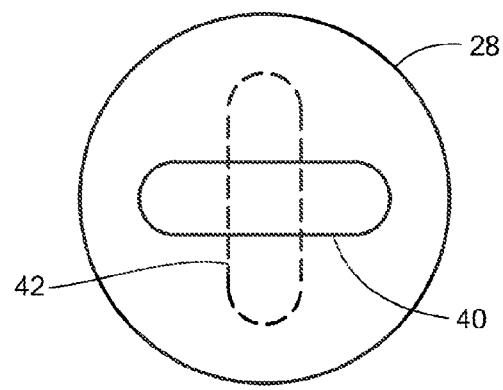
FIG. 7 is an plan view of one end of a drive shaft shown in FIG. 5 having planar protrusions on opposite ends.
Figure 8:
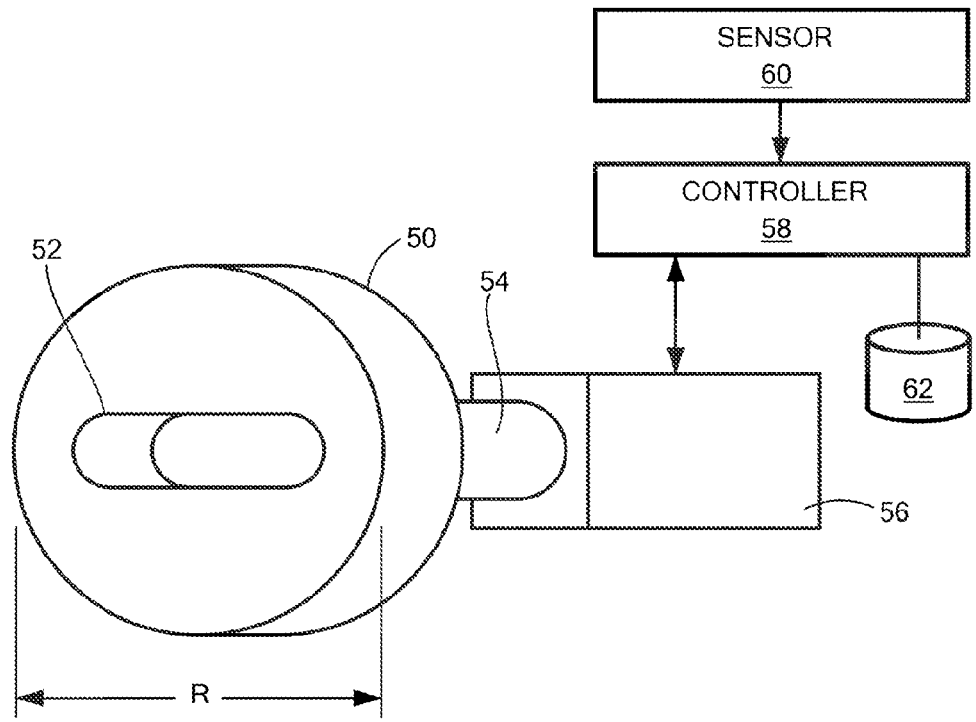
FIG. 8 is a side perspective view of a drive wheel according to one embodiment of the present invention.

In this illustrated embodiment, the drive rod 28 is selectively rotated by a motor 56 (FIG. 8) according to techniques known in the art. By rotating one end of the drive rod by operation of the motor, cooperating belts on opposite sides of the conveyor segment are rotated in unison, thus resulting in linear, even transport of a carrier disposed on an upper surface of the two belts. The drive shaft in one embodiment is a combination of shaft and universal coupling to allow some degree of misalignment between the two sides of the conveyor rail. For example, with respect to FIG. 7, the drive shaft 28 is provided with a flat protrusion on each end, with the protrusion 40 on the proximate end in the drawing being orthogonal to the protrusion 42 on the opposite, distal end. The flat protrusion on one end of the drive shaft fits into a slot 52 in the center of a respective drive wheel 50 mounted on one rail frame 20 (not shown in FIG. 8) and to a motor 56 by a spindle 54, as shown in FIG. 8, while the opposite flat protrusion fits into a respective slot in the center of a respective slave wheel on the other, parallel rail frame. The slave wheel is rotatable about a respective spindle through bearing means known in the art.

Through the use of a common drive shaft, the conveyor belts on both sides of the conveyor segment are synchronized to run at identical speeds, thus avoiding the twisting of work piece carriers on top of the belts as they travel across the conveyor segment. As shown in FIG. 8, the drive wheel 50 and slaved drive wheel on the opposite end of the drive shaft have identical cylindrical shapes. Importantly, the radius R of each drive wheel is identical. This assures that the left and right belts are driven at identical speeds, in spite of the normal tendency of the belts to each seek its own highest tension by locating themselves on the highest point of the idler wheels' crowns.

Due to material variations, conveyor load accelerations, frictional coefficient differences, belt sizes, and mainly the imperfections in wheel shaft alignments, such that not all wheel axes of rotation are not perfectly parallel with each other, the left and right belts normally would otherwise run at slightly different speeds. This would be problematic in clean environments where such speed differentials could lead to friction and particulation. The cylindrically shaped drive wheels counteract this tendency and equalize belt speeds on the two sides.

In an alternative approach, the conveyor belt is a timing belt, having a flat surface presented upwards towards work piece carriers traveling thereon. The inner surface of the drive belt is provided with mechanical features that cooperate with complimentary mechanical features on the outer periphery of the idler wheels. Specifically, in a first embodiment of such a timing belt, the inner surface of the belt is provided with a linear and continuous array of projections such as pyramidal or frusto-pyramidal projections and the idler wheels are provided with a linear array of complimentarily shaped apertures, each configured to receive a respective belt projection as it passes over the idler wheel. In a second embodiment, the projections, such as pyramidal or frusto-pyramidal projections, are formed in a linear band about the outer periphery of the idler wheels, while the belt is provided with complimentarily shaped and spaced apertures adapted to receive the idler wheel projections as the belt travels over the idler wheels. In this second embodiment, the belt apertures may extend through the belt to the work piece carrier contact surface or, if the belt is of sufficient thickness, may only extend partway through. In any such embodiment, however, the timing belt ensures the idler wheels continuous rotate in sync with the overlying belt and particulates are avoided through the avoidance of intermittent belt/wheel contact.

Centering wheels 30 are provided to center the carrier on the belts, in the illustrated embodiment. One or more intermediate idler wheels 32 may also be employed where the placement of the drive rod 28 results in a gap between adjacent idler wheels 10 in the linear array. Such intermediate idler wheels may or may not be provided with pliant rings, as disclosed.

In other embodiments, one of the wheels 10 at either end of the linear array may be powered, or one of the return wheels 26 may be powered, instead of the drive rod as shown. This, however, would require drive elements such as motors on opposite sides of the conveyor segment. Keeping two such motors perfectly synchronized in terms of start or stop times and rotational speed may be a technical challenge.

Alternatively, the drive rod 28 may replace pairs of wheels 10 on opposite sides of the conveyor segment, such as at one end of the linear array of wheels, or one pair of return wheels 26. The drive rod as depicted in FIG. 5 would then be replaced by idler wheels on opposite sides of the conveyor segment. Further still, plural drive rods could be employed, though again this would require accurate synchronization of drive elements associated with each such drive rod.

In the illustrated embodiment, a hysteresis clutch is not employed in conjunction with the motor 56 for avoidance of slippage between a work piece carrier and the belts. In addition, each drive segment is provided with at least one sensor 60, and preferably at least two sensors, for detecting the presence of one or more work piece carriers within the conveyor segment. With at least two sensors, one sensor can be provided proximate each end of the respective drive segment such that the respective controller can know whether a work piece carrier occupies the drive segment. Such sensors are of conventional design and can include the use of optical, magnetic, passive resonant circuit, weight, mechanical interference, and inductive sensors.

The one or more sensors associated with one conveyor drive segment are preferably in communication with a local controller 58 associated with the respective conveyor segment drive motor 56. The controller is preferably provided with a communications interface and is in communication with the respective controllers of the at least one conveyor segments on either side thereof, such as via a communications bus of conventional design and configuration. In one embodiment, the bus is an industrial Controller Area Network (CAN) bus. Obviously, if the conveyor segment is a port, such as an interface to a process tool, the respective controller would only communicate with the one adjacent conveyor segment controller.

Multiple segment-specific controllers are in communication with a respective higher-level controller. This higher level controller has a map of the conveyor segment for which it is responsible, and is programmed with the ability to direct how each carrier within this conveyor domain are to be routed. This information is used to control the response of the individual segment-specific controllers. Depending upon the complexity and size of the overall conveyor system, multiple levels of higher-order controllers may be employed.

The controller for each drive segment is thus capable of detecting the presence of a work piece carrier in an adjacent drive segment and can react to receipt of a new work piece carrier accordingly, such as by decelerating that work piece carrier and bringing it to a stop to avoid a collision with a downstream carrier. The controller is also capable of detecting the movement of a previously stationary work piece carrier in an adjacent drive segment and can respond by accelerating a work piece carrier contained within the respective segment from a stopped condition or can continue transporting the work piece carrier through that drive segment to the next.

Acceleration and deceleration profiles are preferably stored in a memory 62 associated with the local conveyor segment controller. These profiles may be standard profiles to be used for changing work piece carrier speed, or may be maximum values, whereby the controller is programmed to have flexibility in adjusting work piece carrier speed according to the presence or absence of carriers within the respective conveyor drive segment and/or within adjacent conveyor drive segments.

The drive segment, as defined above, is approximately the same length as a work piece carrier, plus a small measure of free space. Thus, for a 300 mm wafer carrier found in semiconductor manufacturing environments, a drive segment is 0.5 meter in length. A typical carrier in a semiconductor manufacturing environment has a mass of approximately 8.5 kg and can travel at speeds of approximately 1 meter per second. A deceleration profile must be selected to enable deceleration of this mass to a stop before it enters a downstream, occupied drive segment. This deceleration profile is generally linear in a first embodiment.

However, it is also envisioned in a further embodiment to use an exponential deceleration profile, where the rate of change in speed is slow at the start but greater at the end, near the stopping point. This takes advantage of the speed-torque characteristic of stepper motors: generally, motor torque in stepper motors is higher at low speeds.

While deceleration profiles have been discussed in the foregoing, similar profiles can be employed for acceleration to achieve maximum acceleration without slippage. Such controller acceleration and deceleration profiles enable work piece carriers to travel at high speed, in very dense flow environments, without the possibility of collisions.

While in the foregoing only adjacent drive segments and/or conveyor segments are described as being in mutual communication, controllers of a larger range of nearby drive or conveyor segments can be in mutual communication to enable faster response to segment occupancy changes and to enable predictive response.

In a further embodiment, a low coefficient of friction and hard idler wheel material, such as nylon may be used while still providing a reduction of particulation between belt and idler wheels. In contrast to some of the previously described embodiments that use high coefficient of friction and soft materials (such as the ring which assures synchronization of their relative speeds) at their interface, this non-limiting embodiment ignores the lack of synchronized speeds and allows some slippage between the belt and the hard idler wheels. In this embodiment many of the idler wheels are cylindrically shaped. The two end idler wheels of the belt loop may have centering crowns. The belt can be elastically stretched over all idlers and drive wheels so that additional tensioning wheels may be omitted.

Figure 9:
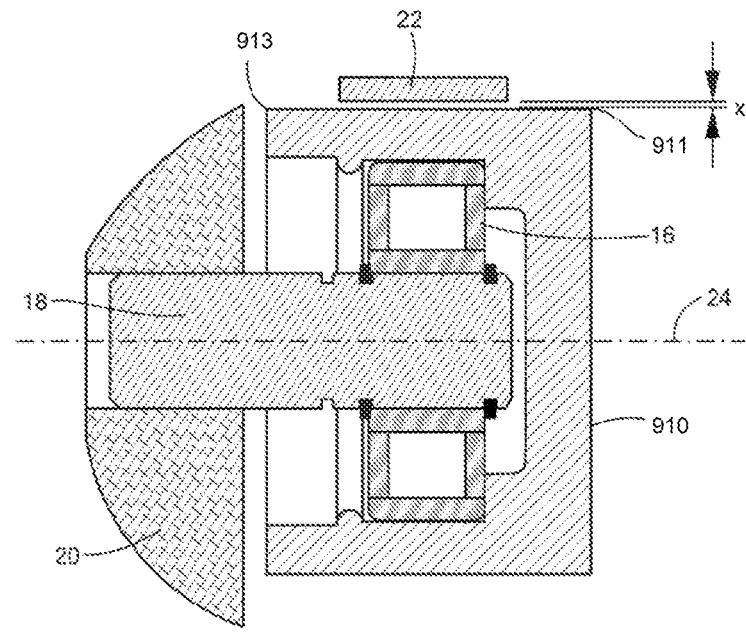
FIG. 9 is a detailed view of a cylindrical wheel in accordance with another embodiment.

FIG. 9 is a detailed view of an idler wheel 910 in accordance with another embodiment. The idler wheel 910 is similar to the idler wheel 10 shown in FIG. 4 and includes a front edge 911 and rear edge 913. In FIG. 9, a drive belt 22 is shown in cross-section, disposed across the top of the cylindrical idler wheel 910. In this embodiment, there is no carrier or other item being transported on or proximate to the idler wheel 910. Accordingly, the lower surface of the belt 22 may be lifted off the upper surface of the idler wheel by a miniscule distance, x, preventing contact with the idler wheel. Once a carrier (not shown) is on the belt 22 above or proximate the idler wheel 910, the weight of the carrier is sufficient to force the undersurface of belt 22 into direct contact with the relatively hard surface of the idler wheel 910. The low coefficient of friction between the belt 22 and the wheel 910 allows the belt 22 to cleanly slide over the wheel 910 without generating unwanted particulates. Thus, the belt 22 and the idler wheel 910 do not require synchronization.

Figure 10:
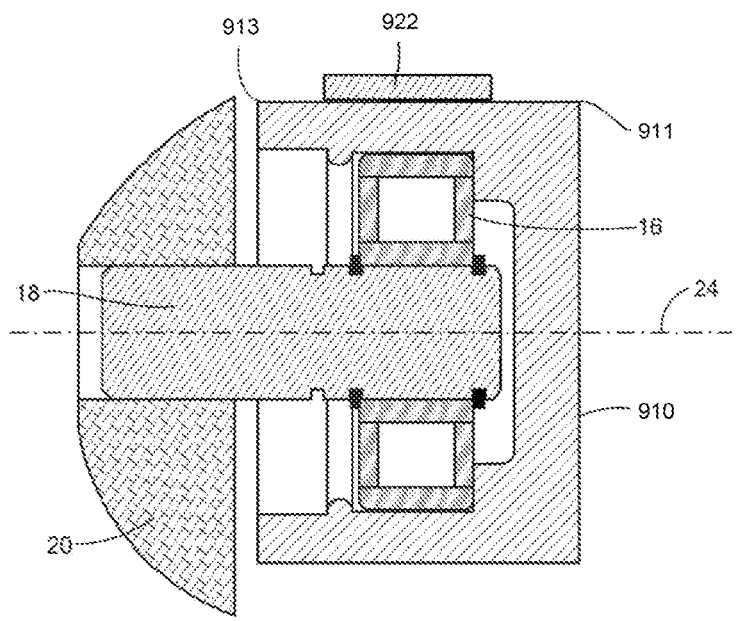
FIG. 10 is a detailed view of a cylindrical idler wheel of FIG. 9 with an elastic belt.

FIG. 10 is a detailed view of the idler wheel 910 of FIG. 9 where the belt 922 is an elastomeric belt that is stretched onto the wheels. The belt 922 serves to directly transport overlying work piece carriers through interaction with all of the idler and drive wheels. In addition to ensuring contact with the idler wheel 910, the elastomeric belt 922 allows the conveyer belt segment to omit tensioning wheels. This reduces the cost of the drive segment as well as avoids a potential point of failure. Furthermore, the process of installing the elastomeric belt 922 is considerably less complicated.

As discussed above with regards to FIG. 6, the hardness of the wheel 910 ensures that the belt 922 does not dip as the weight of the carrier traverses the wheel 910 and instead provides a level, smooth transition for the carrier. Again, the belt 922 is able to glide over the surface of wheel 910 in a particulate free manner due to the low coefficient of friction. Additionally, the materials of the wheel 910 and the belt 922 may be chosen so as to further reduce the possibility of generating particulates.

Figure 11:
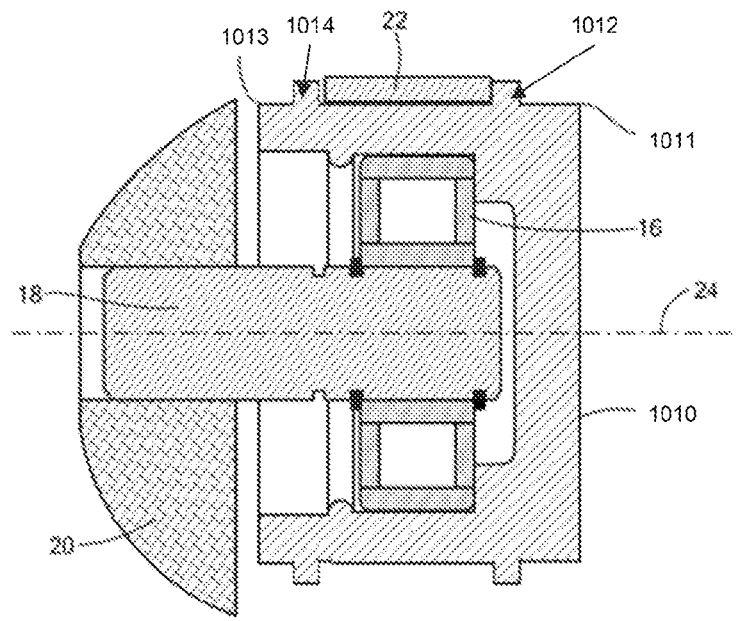
FIG. 11 is a detailed view of a wheel in accordance with a further embodiment.

FIG. 11 is a detailed view of an idler wheel 1010 in accordance with a further embodiment. In this non-limiting embodiment, the idler wheel 1010 includes two centering flanges 1012, 1014 a front flange 1012 close to the front edge 1011 and a rear flange 1014 close to the rear edge 1013. These centering flanges 1012, 1014 define a limited area where the belt 22 is allowed. This prevents the belt 22 from drifting to the side and keeps the belt 22 centered. The flanges 1012, 1014 are sized so that they do not contact the bottom surface of a carrier on the belt 22. This may also account for any compression of the belt 22 due to the weight of the carrier.

In another non-limiting embodiment, the idler wheel 1010 may include a single centering flange 1012, 1014, for example, only the front flange 1012 in order to prevent the belt 22 from moving towards the front edge 1011.

While the shape of the centering flanges 1012, 1014 is shown in FIG. 11 as square shaped, the centering flanges 1012, 1014 may be of any shape suitable to their purpose (e.g., having a slanted side, semi-circular, etc.). Additionally, the individual centering flanges 1012, 1014 may be identically shaped (such as shown) or differently shaped.

Figure 12:
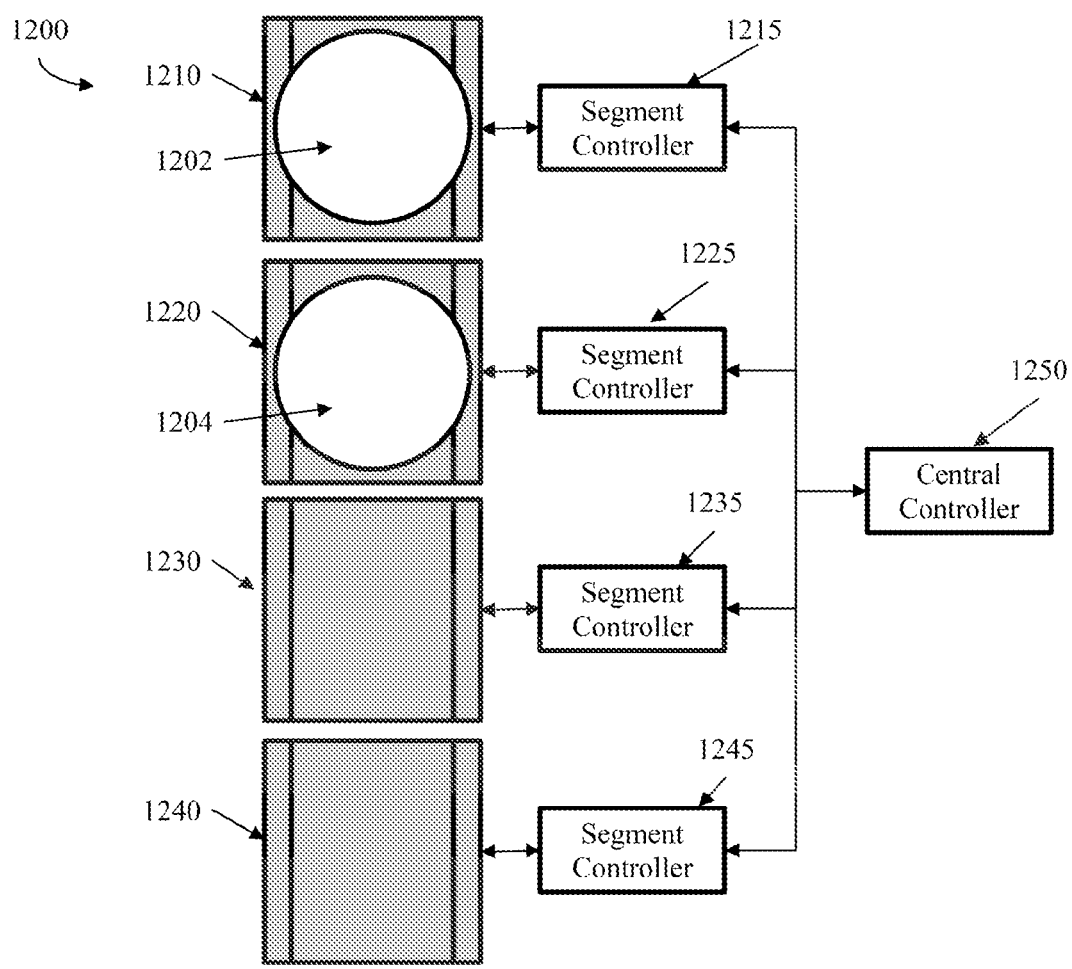
FIG. 12 is a block diagram of a conveyor line in accordance with an embodiment.

FIG. 12 is a block diagram of a conveyor segment 1200 in accordance with an embodiment. The conveyor segment 1200 is composed of a series of drive segments 1210, 1220, 1230, 1240. For illustration purposes only the drive segments 1210, 1220, 1230, 1240 are shown; however, the conveyor segment 1200 may include additional components for processing carriers 1202, 1204 and/or components to redirect the flow of the carriers 1202, 1204 (e.g., to form loops and/or splits along the conveyor segment 1200). Likewise, drive segments 1210, 1220, 1230, 1240 may be of varying lengths and shapes.

Each drive segment 1210, 1220, 1230, 1240 is managed by a respective segment controller 1215, 1225, 1235, 1245. These segment controllers 1215, 1225, 1235, 1245 may in turn be operated by a central controller 1250. In one non-limiting embodiment, the segment controller 1215, 1225, 1235, 1245 operates virtually independently of the central controller 1250 receiving limited control and limited feedback. Alternatively, the central controller 1250 may operate to more strictly coordinate the operation of the various drive segments 1210, 1220, 1230, 1240.

Figure 13:
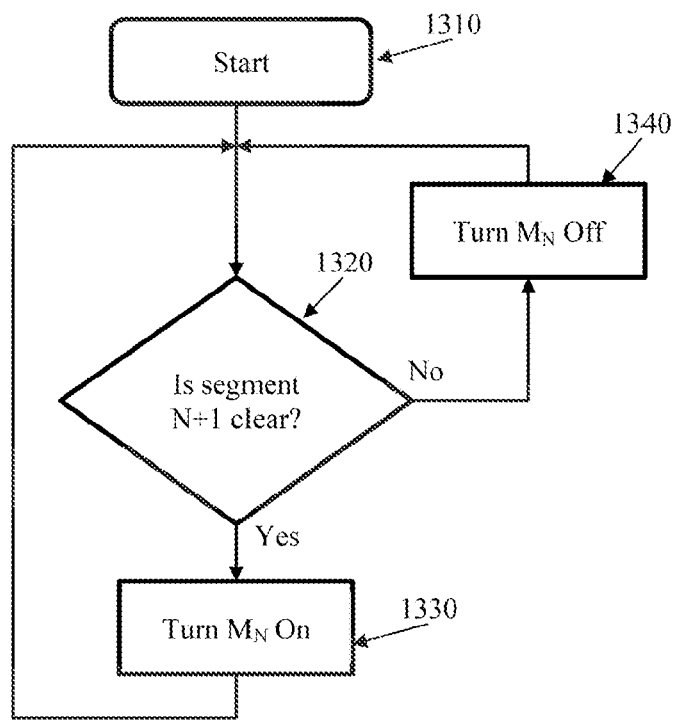
FIG. 13 is a flow diagram of logic for a local controller in accordance with one embodiment.

FIG. 13 is a flow diagram of logic for a local controller 1215, 1225, 1235, 1245 in accordance with an independent functioning embodiment. The logic allows for segmented control of individual drive segments 1210, 1220, 1230, 1240 which provides a collision free carrier flow. Using local logic the segment controllers 1215, 1225, 1235, 1245 can operate independent of global logic in a way that avoids collisions while maintaining high flow density.

Starting at step 1310, the logic proceeds to step 1320 and checks if the next drive segment (segment N+1) is clear. This may be done by directly sensing whether the segment is clear, by checking with the segment controller of the next drive segment and/or by checking with a central controller. If the next drive segment is clear (Yes), the segment controller turns on the motor of the drive segment ($M_N$) (or keeps it running) and moves the carrier onto the next drive segment in accordance with step 1330. On the other hand, if the next drive segment is not clear (No), the segment controller moves on to step 1340 and turns off the motor (or keeps it off). Next, the segment controller returns to step 1320 and keeps checking whether the next drive segment is clear.

The process can begin once the drive segment is ready to move a carrier onto the next drive segment or it can be continuously running in order to advance the carriers as soon as possible. Additionally, the logic may include additional steps, for example, to automatically turn off the motor once the carrier is clear (without checking that the carrier is on the next drive segment), a delay after step 1340 before rechecking in step 1320, etc.

In an alternative embodiment, the central controller 1250 may perform the logic described in 1320 of FIG. 13 and instruct the local controllers 1215, 1225, 1235, 1245 accordingly.

Returning to FIG. 12, using the logic of FIG. 13 the segment controller 1215 would turn off the motor for drive segment 1210 until such time that the carrier 1204 is clear of the drive segment 1220. Meanwhile, the segment controller 1225 would sense that drive segment 1230 is clear and turn on the motor to drive segment 1220 so that the carrier 1204 is advanced. Once carrier 1204 is moved off drive segment 1220, the segment controller 1215 will detect that drive segment 1220 is clear and start moving carrier 1202 onto drive segment 1220.

Thus, the individual drive segments 1210, 1220, 1230, 1240 are able to keep the flow of the carriers moving while preventing collisions. By selectively driving the drive segments 1210, 1220, 1230, 1240, the conveyor segment 1200 is able to ensure the carriers are moved along quickly and efficiently in order to keep the density of carriers high. Any gap between carriers can be swiftly eliminated as the lagging carrier is moved up along the conveyor segment 1200 until the carriers are on neighboring drive segments.

Accordingly, the conveyor segment 1200 will hold the maximum possible carriers. This in turn allows carrier processing elements to operate more efficiently as they are not required to hold carriers until the conveyor segment 1200 is ready to move again.

In a power saving embodiment, the local controllers 1215, 1225, 1235, 1245 can turn off the motor once a carrier has been cleared from the respective segment. The local controllers 1215, 1225, 1235, 1245 can then turn on the motor in response to a carrier being moved onto the respective segment, onto the immediately preceding drive segment or onto a segment further upstream.

Various operations described are purely exemplary and imply no particular order. Further, the operations can be used in any sequence when appropriate and can be partially used. With the above embodiments in mind, it should be understood that additional embodiments can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and otherwise manipulated.

Any of the operations described that form part of the presently disclosed embodiments may be useful machine operations. Various embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

An embodiment provides a conveyor transport for high density Work In Process (WIP) unit flow along conveyor paths in a clean manufacturing environment. The conveyor transport includes means for defining conveyor paths (such as, drive segments for example) to transport WIP units. The defining means includes two or more segments along the conveyor paths. The two or more segments are individually driven. The conveyor transport further includes means for selectively driving (such as, a motor for example) a driven segment of the two or more segments to selectively transport the WIP units along the driven segment, and between the two or more segments. Means for sensing (such as, a sensor for example) when the WIP units are located on specific segments of the two or more segments are included. The conveyor transport also includes means for controlling (such as, a data processor for example) the selectively driving means. The controlling means is arranged to operate in response to an output of the sensing means such that locations of the WIP units are controlled relative to each other, without collisions. The driven segment is selectively started and stopped in a controlled manner to be smooth. During starting and stopping of the driven segment, accelerations and decelerations of the driven segment are controlled such that a force to accelerate or decelerate the WIP units is less than a frictional force between the selectively driving means and the WIP units, and such that the WIP units are prevented from slipping on the selectively driving means.

In a further embodiment of the conveyor transport above, the WIP units are accelerated to full conveyor speed or decelerated from full conveyor speed within the driven segment.

In another embodiment of any one of the conveyor transports above, the two or more segments each include laterally spaced parallel driven conveyor belts and cylindrical drive wheels. Each conveyor belt may be wrapped around crowned idler wheels at two extreme ends of a loop formed by the conveyor belt.

The conveyor transport may also include center idler wheels under each of the conveyor belts. The center idler wheels may be located between the crowned idler wheels and the center idler wheels are cylindrically shaped. The center idler wheels may include an angled side flange configured to provide lateral guidance of the WIP units.

The center idler wheels may be arranged in a row such that a return leg of a conveyor belt is located under the row. The return leg may be driven by a cylindrical common drive shaft configured to assure identical speed for each of the two conveyor belts. The drive shaft may include an internal universal coupling configured to accommodate side to side misalignment of conveyor rails.

The conveyor belts may include elastic material, and each of the conveyor belts may be stretched on the respective cylindrical drive wheels.

In a further embodiment of any one of the conveyor transports above, all materials of construction are static dissipative.

In another embodiment of any one of the conveyor transports above, the defining means is further for defining conveyor paths for: a sequence of WIP units and/or concurrently transportable WIP units.

A further embodiment provides a conveyor transport for high density Work In Process (WIP) unit flow along conveyor paths in a clean manufacturing environment. The conveyor transport includes one or more conveyor paths configured to transport WIP units. The one or more conveyor paths include two or more segments. The two or more segments are individually driven. The conveyor transport further includes one or more motors configured to selectively drive one or more belts of a driven segment of the two or more segments in order to selectively transport the WIP units along the driven segment, and between the two or more segments. Each of the two or more segments may be driven segments with their own motor. One or more sensors configured to sense when the WIP units are located on specific segments of the two or more segments are included. The conveyor transport also includes a controller configured to control the motor. The controller is configured to operate in response to an output of the sensor such that locations of the WIP units are controlled relative to each other, without collisions. The driven segment is selectively started and stopped in a controlled manner to be smooth. During starting and stopping of the driven segment, accelerations and decelerations of the driven segment are controlled such that a force to accelerate or decelerate the WIP units is less than a frictional force between the one or more belts and the WIP units, and such that the WIP units are prevented from slipping on the one or more belts.

In another embodiment of the conveyor transport above, the WIP units are accelerated to full conveyor speed or decelerated from full conveyor speed within the driven segment.

In a further embodiment of any one of the conveyor transports above, the at least one belt includes laterally spaced parallel driven conveyor belts and the driven segment includes the conveyor belts and cylindrical drive wheels. Each conveyor belt may be wrapped around crowned idler wheels at two extreme ends of a loop formed by the conveyor belt. The conveyor transport may also include center idler wheels under each of the conveyor belts, the center idler wheels located between the crowned idler wheels. The center idler wheels are cylindrically shaped.

The center idler wheels may include an angled side flange configured to provide lateral guidance of the WIP units.

The center idler wheels may be arranged in a row. A return leg of a conveyor belt may be located under the row, and the return leg is driven by a cylindrical common drive shaft configured to assure identical speed for each of the two conveyor belts. The drive shaft may include an internal universal coupling configured to accommodate side to side misalignment of conveyor rails.

In another embodiment of any one of the conveyor transports above, the conveyor belts include elastic material, and each of the conveyor belts is stretched on the respective cylindrical drive wheels.

In a further embodiment of any one of the conveyor transports above, all materials of construction are static dissipative.

In another embodiment of any one of the conveyor transports above, the one or more conveyor paths are configured to transport: a sequence of WIP units and/or concurrently transportable WIP units.

Many changes in the details, materials, and arrangement of parts and steps, herein described and illustrated, can be made by those skilled in the art in light of teachings contained hereinabove. Accordingly, it will be understood that any following claims are not to be limited to the embodiments disclosed herein and can include practices other than those specifically described, and are to be interpreted as broadly as allowed under the law.

What is claimed is:

1. A conveyor transport for high density Work In Process (WIP) unit flow along conveyor paths in a clean manufacturing environment, the conveyor transport comprising:
    a plurality of conveyor path means for defining conveyor paths to transport WIP units wherein at least two conveyor path means of the plurality of conveyor path means are individually driven;
    means for selectively driving a driven conveyor path means of the plurality of conveyor path means to selectively transport the WIP units along the driven conveyor path means, and between the plurality of conveyor path means;
    means for sensing when the WIP units are located on specific conveyor path means of the plurality of conveyor path means; and
    means for controlling the selectively driving means, wherein the controlling means is arranged to operate in response to an output of the sensing means such that locations of the WIP units are controlled relative to each other, without collisions,
    wherein the driven conveyor path means is selectively started and stopped in a controlled manner, wherein, during starting and stopping of the driven conveyor path means, accelerations and decelerations of the driven conveyor path means are controlled such that a force to accelerate or decelerate the WIP units is less than a frictional force between the selectively driving means and the WIP units, and such that the WIP units are prevented from slipping on the selectively driving means;
    wherein the plurality of conveyor path means each comprise laterally spaced parallel driven conveyor belts and each conveyor belt is wrapped around crowned idler wheels at two extreme ends of a loop formed by the conveyor belt.

2. The conveyor transport according to claim 1, wherein the WIP units are accelerated to full conveyor speed from a complete stop or decelerated from full conveyor speed to a complete stop within a length of the driven conveyor path means.

3. The conveyor transport according to claim 1, wherein the plurality of conveyor path means each further comprise at least one cylindrical drive wheel.

4. The conveyor transport according to claim 1, further comprising center idler wheels under each of the conveyor belts, the center idler wheels located between the crowned idler wheels, wherein the center idler wheels are cylindrically shaped.

5. The conveyor transport according to claim 4, wherein the center idler wheels comprise an angled side flange configured to provide lateral guidance of the WIP units.

6. The conveyor transport according to claim 4, wherein the center idler wheels are arranged in a row, a return leg of a conveyor belt is located under the row, and the return leg is driven by a cylindrical common drive shaft configured to assure identical speed for each of the two conveyor belts.

7. The conveyor transport according to claim 6, wherein the drive shaft comprises an internal universal coupling configured to accommodate side to side misalignment of conveyor rails.

8. The conveyor transport according to claim 3, wherein the conveyor belts comprise elastic material, and each of the conveyor belts is stretched on the respective at least one cylindrical drive wheel.

9. The conveyor transport according to claim 1, wherein all materials of construction are static dissipative.

10. The conveyor transport according to claim 1, wherein the plurality of conveyor path means is further for defining conveyor paths for one of: a sequence of WIP units, and concurrently transportable WIP units.

11. A conveyor transport for high density Work In Process (WIP) unit flow along conveyor paths in a clean manufacturing environment, the conveyor transport comprising:
    at least one conveyor path configured to transport WIP units, the at least one conveyor path comprising at least two segments, wherein the at least two segments are individually driven;
    at least one motor configured to selectively drive at least one belt of a driven segment of the at least two segments in order to selectively transport the WIP units along the driven segment, and between the at least two segments;
    at least one sensor configured to sense when the WIP units are located on specific segments of the at least two segments; and
    a controller configured to control the at least one motor, wherein the controller is configured to operate in response to an output of the sensor such that locations of the WIP units are controlled relative to each other, without collisions,
    wherein the driven segment is selectively started and stopped in a controlled manner
    wherein, during starting and stopping of the driven segment, accelerations and decelerations of the driven segment are controlled such that a force to accelerate or decelerate the WIP units is less than a frictional force between the at least one belt and the WIP units, and such that the WIP units are prevented from slipping on the at least one belt,
    wherein the at least one belt comprises laterally spaced parallel driven conveyor belts and the driven segment comprises the conveyor belts, and wherein each conveyor belt is wrapped around crowned idler wheels at two extreme ends of a loop formed by the conveyor belt.

12. The conveyor transport according to claim 11, wherein the WIP units are accelerated to full conveyor speed from a complete stop or decelerated from full conveyor speed to a complete stop within a length of the driven segment.

13. The conveyor transport according to claim 11, wherein the driven segment further comprises at least one cylindrical drive wheel.

14. The conveyor transport according to claim 11, further comprising center idler wheels under each of the conveyor belts, the center idler wheels located between the crowned idler wheels, wherein the center idler wheels are cylindrically shaped.

15. The conveyor transport according to claim 14, wherein the center idler wheels comprise an angled side flange configured to provide lateral guidance of the WIP units.

16. The conveyor transport according to claim 14, wherein the center idler wheels are arranged in a row, a return leg of a conveyor belt is located under the row, and the return leg is driven by a cylindrical common drive shaft configured to assure identical speed for each of the two conveyor belts.

17. The conveyor transport according to claim 16, wherein the drive shaft comprises an internal universal coupling configured to accommodate side to side misalignment of conveyor rails.

18. The conveyor transport according to claim 13, wherein the conveyor belts comprise elastic material, and each of the conveyor belts is stretched on the respective at least one cylindrical drive wheel.

19. The conveyor transport according to claim 11, wherein all materials of construction are static dissipative.

20. The conveyor transport according to claim 11, wherein the at least one conveyor path is configured to transport at least one of: a sequence of WIP units, and concurrently transportable WIP units.

21. A conveyor path segment for high density Work In Process (WIP) unit flow conveyor path in a clean manufacturing environment, the conveyor path segment comprising:
    two arrays of idler wheels located on respective conveyor rails, each array having a linear segment comprising two crowned idler wheels at extreme ends of the linear segment and cylindrically shaped center idler wheels located between the two crowned idler wheels;
    two conveyor belts, each conveyor belt being a serpentine belt forming a loop around an associated array of idler wheels;
    a cylindrical common drive shaft configured to assure identical speed for each of the two conveyor belts, wherein the cylindrical common drive shaft comprises a universal coupling configured to accommodate side to side misalignment of the conveyor rails; and
    a motor configured to selectively drive the cylindrical common drive shaft in order to selectively transport a WIP unit along the conveyor path segment;
    wherein the conveyor path segment is configured to be selectively started and stopped in a controlled manner, and
    wherein, during starting and stopping of the driven segment, accelerations and decelerations of the conveyor belts are controlled such that a force to accelerate or decelerate the WIP units is less than a frictional force between the conveyor belts and the WIP units, and such that the WIP units are prevented from slipping on the conveyor belts.

22. The conveyor path segment according to claim 21, further comprising:
    a drive wheel mounted on one conveyor rail and connected to the motor; and
    a slaved drive wheel mounted on the other conveyor rail and connected to the drive wheel by the cylindrical common drive shaft,
    wherein the drive wheel and the slaved drive wheel have identical cylindrical shapes of radius, R.

* * * * *